(12) United States Patent
Whitaker et al.

(10) Patent No.: US 12,093,276 B1
(45) Date of Patent: Sep. 17, 2024

(54) EMULATING A NON-RELATIONAL DATABASE ON A RELATIONAL DATABASE WITH A DISTRIBUTED DATA STORE

(71) Applicant: Amazon Technologies, Inc., Seattle, WA (US)

(72) Inventors: Andrew James Whitaker, Seattle, WA (US); Pravin Mittal, Redmond, WA (US); Stefano Stefani, Issaquah, WA (US); Kanishka Chaturvedi, Seattle, WA (US); Maruthi Manohar Reddy Devarenti, Seattle, WA (US); Dhruv Goel, Seattle, WA (US); Rajesh Iyer, Bellevue, WA (US); Nitin Ahuja, Vancouver (CA); Nilanjan Basu, Renton, WA (US); Pushap Goyal, Seattle, WA (US); Abhilash Reddy Koppula, Seattle, WA (US); VamsiKrishna Chaitanya Manchem, Kirkland, WA (US); Lishi Jiang, Bellevue, WA (US); Abhijeet Pandurang More, Seattle, WA (US); Hong Yang, Seattle, WA (US); Sandeep Bhatia, Bothell, WA (US); Ming-Chuan Wu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 321 days.

(21) Appl. No.: 16/199,039

(22) Filed: Nov. 23, 2018

(51) Int. Cl.
*G06F 16/25* (2019.01)
*G06F 16/21* (2019.01)
(Continued)

(52) U.S. Cl.
CPC ............ *G06F 16/252* (2019.01); *G06F 16/21* (2019.01); *G06F 16/24542* (2019.01); *G06F 16/258* (2019.01); *G06F 16/93* (2019.01)

(58) Field of Classification Search
CPC .. G06F 16/21; G06F 16/24542; G06F 16/252; G06F 16/258; G06F 16/93
See application file for complete search history.

(56) References Cited

U.S. PATENT DOCUMENTS

| 5,379,419 A | 1/1995 | Heffernan et al. |
|---|---|---|
| 6,289,334 B1 | 9/2001 | Reiner et al. |

(Continued)

OTHER PUBLICATIONS

Igor Tatarinov, Stratis D. Viglas, Kevin Beyer, Jayavel Shanmugasundaram, Eugene Shekita, and Chun Zhang. 2002. Storing and querying ordered XML using a relational database system. In Proceedings of the 2002 ACM Sigmod international conference on Management of data (SIGMOD '02). ACM. (Year: 2002).*

*Primary Examiner* — Brittany N Allen
(74) *Attorney, Agent, or Firm* — S. Scott Foster; Kowert, Hood, Munyon, Rankin & Goetzel, P.C.

(57) ABSTRACT

A non-relational database may be emulated using a relational database with a distributed data store. A request to access the non-relational database may be received at a frontend for a relational database engine that emulates an interface for a non-relational database engine. The request may be translated into the format for the relational database engine and performed by the relational database engine. The relational database engine may access data for the non-relational database at storage nodes that store the data in a relational table column of non-relational data type.

20 Claims, 9 Drawing Sheets

(51) Int. Cl.
  *G06F 16/2453* (2019.01)
  *G06F 16/93* (2019.01)

(56) References Cited

U.S. PATENT DOCUMENTS

| | | | |
|---|---|---|---|
| 6,442,548 B1* | 8/2002 | Balabine | G06F 16/10 |
| 6,647,391 B1* | 11/2003 | Smith | G06F 16/284 |
| 7,051,039 B1 | 5/2006 | Murthy et al. | |
| 7,409,400 B2* | 8/2008 | Ramarao | G06F 21/552 |
| 7,853,961 B2* | 12/2010 | Nori | G06F 16/289 |
| | | | 719/328 |
| 8,407,196 B1 | 3/2013 | Kryukov | |
| 9,514,007 B2* | 12/2016 | Gupta | G06F 11/1471 |
| 9,798,752 B1* | 10/2017 | Naffziger | G06F 16/258 |
| 9,886,483 B1* | 2/2018 | Harrison | G06F 16/28 |
| 10,255,336 B2* | 4/2019 | Waas | G06F 16/252 |
| 2001/0037345 A1* | 11/2001 | Kiernan | G06F 16/284 |
| | | | 707/999.102 |
| 2002/0116371 A1* | 8/2002 | Dodds | G06F 16/284 |
| 2002/0123993 A1* | 9/2002 | Chau | G06F 16/86 |
| | | | 707/999.005 |
| 2003/0208458 A1* | 11/2003 | Dettinger | G06F 16/2471 |
| 2004/0044959 A1* | 3/2004 | Shanmugasundaram | |
| | | | G06F 16/83 |
| | | | 715/227 |
| 2004/0064466 A1* | 4/2004 | Manikutty | G06F 16/8373 |
| 2008/0104014 A1* | 5/2008 | Burger | G06F 16/24542 |
| 2009/0150367 A1* | 6/2009 | Melnik | G06F 16/2455 |
| 2014/0114993 A1* | 4/2014 | Luo | G06F 16/86 |
| | | | 707/756 |
| 2017/0006135 A1* | 1/2017 | Siebel | H04L 67/2833 |
| 2019/0362011 A1* | 11/2019 | Oks | G06F 16/2457 |
| 2020/0073972 A1* | 3/2020 | Busjaeger | H04L 67/02 |

* cited by examiner

EMULATING A NON-RELATIONAL DATABASE ON A RELATIONAL DATABASE WITH A DISTRIBUTED DATA STORE

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information. New technologies more and more seek to reduce both the complexity and storage requirements of maintaining data while simultaneously improving the efficiency of data processing.

Figure 1:
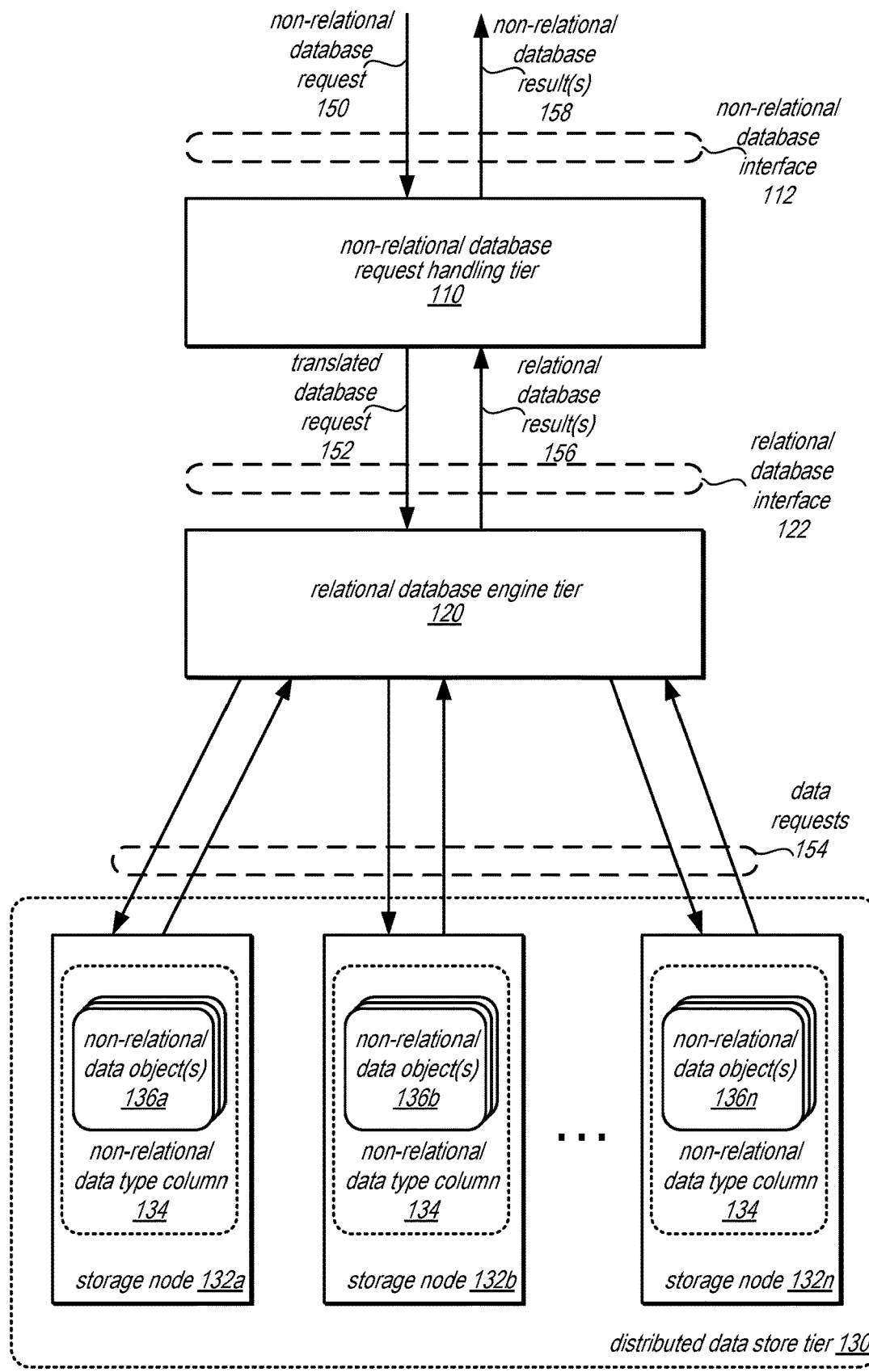
FIG. 1 is logical block diagram for emulating a non-relational database on a relational database with a distributed data store, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION OF EMBODIMENTS

Various embodiments of emulating a non-relational database on a relational database with a distributed data store are described herein. Non-relational databases offer flexible storage for storing, managing, and accessing data that does not necessarily conform to a strict schema. For example, a non-relational database may store data using a collections, document, attribute model in which documents in the same collection can have different attributes with different attribute types and/or values. While non-relational databases can provide good performance in some scenarios, some non-relational databases are not as performant when operated at scale. Provider networks or other cloud-based implementations that may offer a non-relational database solution may be unable to host some non-relational database systems at large scale (e.g., hundreds or thousands of instances of a non-relational database), for instance.

Instead of creating an entirely new version of a non-relational database, which is costly in terms of client effort (e.g., to modify applications to use a new system) and provider effort (e.g., to build a reliable version of a non-relational database), techniques for emulating a non-relational database on a relational database with a distributed data store may be utilized to leverage the performance benefits and stability of existing relational database services or systems that are optimized for large scale deployments. For example, relational database systems that can utilize a separate and distributed backend data store as discussed below can provide better I/O performance, with higher durability and greater capacity than a non-relational database that stores both data and database engine together.

FIG. 1 is logical block diagram for emulating a non-relational database on a relational database with a distributed data store, according to some embodiments. Non-relational database requests 150 (e.g., queries, updates, operations, or other items to change or modify the non-relational database or the configuration of the non-relational database) may be received via non-relational database interface 112 at non-relational database request handling tier 110. Non-relational database interface 112 may be a programmatic interface (e.g., API), a protocol or other communication format for interacting with a non-relational database, command line interface and/or a graphical user interface (GUI) (which may leverage a programmatic interface) via which clients can submit requests. Requests 150 may be specified in a query or database language for non-relational databases, in some embodiments.

Non-relational database request handling tier 110 may support or otherwise emulate a non-relational database so that a client submitting requests could design, implement, and/or execute a program using the emulated non-relational database without any modifications (e.g., implemented the same as if the non-relational database were not emulated). As discussed in detail below with regard to FIG. 6, non-relational database request handling tier 110 may implement request parsing and translation into a format for relational database engine 120. In some embodiments, translated requests 150 may be cached or otherwise stored for repeat execution (e.g., by saving a query plan generated for a previously received version of the request), saving translation time and resource costs.

Relational database engine tier 120 may receive the translated database request 152 via relational database interface 122. Relational database engine tier 120 may parse the request, perform query planning, and execute the translated database request 152 by performing one or more data requests 154 to distributed data store tier 130. For those features of a non-relational database that relational database engine tier 120 does not natively support, extensions, libraries, or other additional features can be added to relational database engine tier 120, as discussed below with regard to FIG. 6, in order to ensure that the emulation of the non-relational database supports the features that may be invoked by a client application.

Distributed data store tier 130 may store data for the emulated non-relational database as non-relational data object(s), such as non-relational data objet(s) 136a, 136b, and 136n. The non-relational data objects 136 may be distributed across multiple storage nodes, such as storage nodes 132a, 132b, and 132n. Storing the non-relational data objects 136 in distributed fashion separate from the relational database engine 120 (and the non-relational database request handling tier 110) may increase the capacity, durability, and availability of the emulated non-relational database without having to shard, divide, or otherwise account for distributed data in either the client (e.g., for an application to handle making requests to different shards of the emulated non-relational database) or to make the non-relational database request handling tier 110 to separately route requests to different shards. However, in some embodiments, non-relational database request handling tier 110 could be implemented separate from relational database engine 120 (unlike the examples discussed below with regard to FIGS. 3 and 6).

Non-relational data objects 136 may be stored in one or more columns specified with a non-relational data type, in some embodiments. For example, a non-relational data type column could include an Extensible Markup Language (XML) type column, a JavaScript Object Notation (JSON) type column (including variants of JSON such as JSON binary (JSONB) which stores the data in binary form as opposed to the text form of JSON) or other non-relational data types or formats, which may include non-relational database platform specific data types or formats, such as Binary JSON (BSON) implemented for use with MongoDB. By storing non-relational data objects 136 within a column 134 of a table that can be accessed, managed, queried, and so on by relational database tier 120, the various performance advantages offered to a user of a relational style database, including consistency, reliability, capacity, among other advantages, are extended to the emulated non-relational database in scenarios where the emulated non-relational database does not offer the same performance advantages or does not offer them as strongly (e.g., increased read and/or write performance utilizing the relational database engine tier 120 for the emulated non-relational database than could be provided if the non-relational database were not emulated but implemented).

Relational database engine tier may 120 may return relational database result(s) 156 for queries or other operations that invoke or request data from the emulated non-relational database, in some embodiments. Non-relational database request handling tier 110 may then format results 156 (or acknowledgment(s)) and return the non-relational database result(s) 158 (or acknowledgement(s)) according to the expected non-relational database interface 112, in some embodiments.

Please note, FIG. 1 is provided as a logical illustration of non-relational database request handling, a relational database engine, and distributed data store and respective interactions and is not intended to be limiting as to the physical arrangement, size, or number of components, modules, or devices to implement such features.

The specification first describes an example network-based non-relational database service, a document database service, that emulates the document database using a relational database and a distributed data store. Included in the description of the example network-based non-relational database service are various aspects of the example network-based non-relational database service, such as a database engine head node, read replica nodes, and a separate storage service. The specification then describes flowcharts of various embodiments of methods for emulating a non-relational database on a relational database with a distributed data store. Next, the specification describes an example computer system that may implement the disclosed techniques. Various examples are provided throughout the specification.

The systems described herein may, in some embodiments, implement a web service that enables clients (e.g., subscribers) to operate a data storage system in a cloud computing environment. In some embodiments, the data storage system may be an enterprise-class non-relational database system. In some embodiments, queries and other requests may be directed to database storage that is distributed across multiple physical resources, and the database system may be scaled up or down on an as needed basis. In some embodiments, clients may submit queries in a number of ways, e.g., interactively via a command line or graphical user interface to the database system. In other embodiments, external applications and programs may submit queries using driver interfaces to the database system.

The system described herein may, in some embodiments, implement a service-oriented database architecture in which various functional components of a single database system are intrinsically distributed. For example, rather than lashing together multiple complete and monolithic database instances (each of which may include extraneous functionality, such as an application server, search functionality, or other functionality beyond that required to provide the core functions of a database), these systems may organize the basic operations of a database (e.g., query processing, transaction management, caching and storage) into tiers that may be individually and independently scalable. For example, in some embodiments, each database instance in the systems described herein may include a database tier (which may include a single database engine head node and a client-side storage system driver), and a separate, distributed storage system (which may include multiple storage nodes that collectively perform some of the operations traditionally performed in the database tier of existing systems).

As described in more detail herein, in some embodiments, some of the lowest level operations of a database, (e.g., backup, restore, snapshot, recovery, and/or various space management operations) may be offloaded from the database tier to the storage tier and distributed across multiple nodes and storage devices. For example, in some embodiments, rather than the database engine applying changes to database tables (or data pages thereof) and then sending the modified data pages to the storage layer, the application of changes to the stored database tables (and data pages thereof) may be the responsibility of the storage layer itself. In such embodiments, redo log records, rather than modified data pages, may be sent to the storage layer, after which redo processing (e.g., the application of the redo log records) may be performed somewhat lazily and in a distributed manner (e.g., by a background process). In some embodiments, crash recovery (e.g., the rebuilding of data pages from stored redo log records) may also be performed by the storage layer and may also be performed by a distributed (and, in some cases, lazy) background process.

In some embodiments, because only redo logs (and not modified data pages) are sent to the storage layer, there may be much less network traffic between the database tier and the storage layer than in existing database systems. In some embodiments, each redo log may be on the order of one-tenth the size of the corresponding data page for which it specifies a change. Note that requests sent from the database tier and the distributed storage system may be asynchronous and that multiple such requests may be in flight at a time.

In some embodiments, the systems described herein may partition functionality of a database system differently than in a traditional database, and may distribute only a subset of the functional components (rather than a complete database instance) across multiple machines in order to implement scaling. For example, in some embodiments, a client-facing tier may receive a request specifying what data is to be stored or retrieved, but not how to store or retrieve the data. This tier may perform request parsing and/or optimization (e.g., non-relational database request parsing and translation into relational database requests for optimization), while another tier may be responsible for query execution. For example, the features of a non-relational database frontend implemented on a database engine head node as discussed below with regard to FIGS. 3 and 6 could be implemented across one set of nodes in a tier, while performance of the translated requests in a relational database format could be performed by nodes in a separate tier (not illustrated below). In some embodiments, a storage tier, like the storage service discussed below with regard to FIG. 4, may then be responsible for providing Durability of the stored data in the presence of various sorts of faults. For example, this tier may be responsible for change logging, recovery from a database crash, managing access to the underlying storage volumes and/or space management in the underlying storage volumes.

In some embodiments, the database systems described herein may retain much of the structure of the upper half of the database instance discussed in the example above, but may redistribute responsibility for at least portions of the backup, restore, snapshot, recovery, and/or various space management operations to the storage tier. Redistributing functionality in this manner and tightly coupling log processing between the higher database tier(s) and the storage tier may improve performance, increase availability and reduce costs, when compared to previous approaches to providing a scalable database. For example, network and input/output bandwidth requirements may be reduced, since only redo log records (which are much smaller in size than the actual data pages) may be shipped across nodes or persisted within the latency path of write operations. In addition, the generation of data pages can be done independently in the background on each storage node (as foreground processing allows), without blocking incoming write operations. In some embodiments, the use of log-structured, non-overwrite storage may allow backup, restore, snapshots, point-in-time recovery, and volume growth operations to be performed more efficiently, e.g., by using only metadata manipulation rather than movement or copying of a data page. In some embodiments, the storage tier may also assume the responsibility for the replication of data stored on behalf of clients (and/or metadata associated with that data, such as redo log records) across multiple storage nodes. For example, data (and/or metadata) may be replicated locally (e.g., within a single "availability zone" in which a collection of storage nodes executes on its own physically distinct, independent infrastructure) and/or across availability zones in a single region or in different regions.

In various embodiments, the database systems described herein may support a standard or custom application programming interface (API) for a variety of database operations. For example, the API may support operations for creating a non-relational database, creating a collection, document, table or item, altering a collection, document, table or item, creating a user, dropping a user, inserting data into a collection, document, table or item (e.g., as attributes), copying values, querying data from within a collection, document, table or item, cancelling or aborting a query, and/or other operations.

Figure 2:
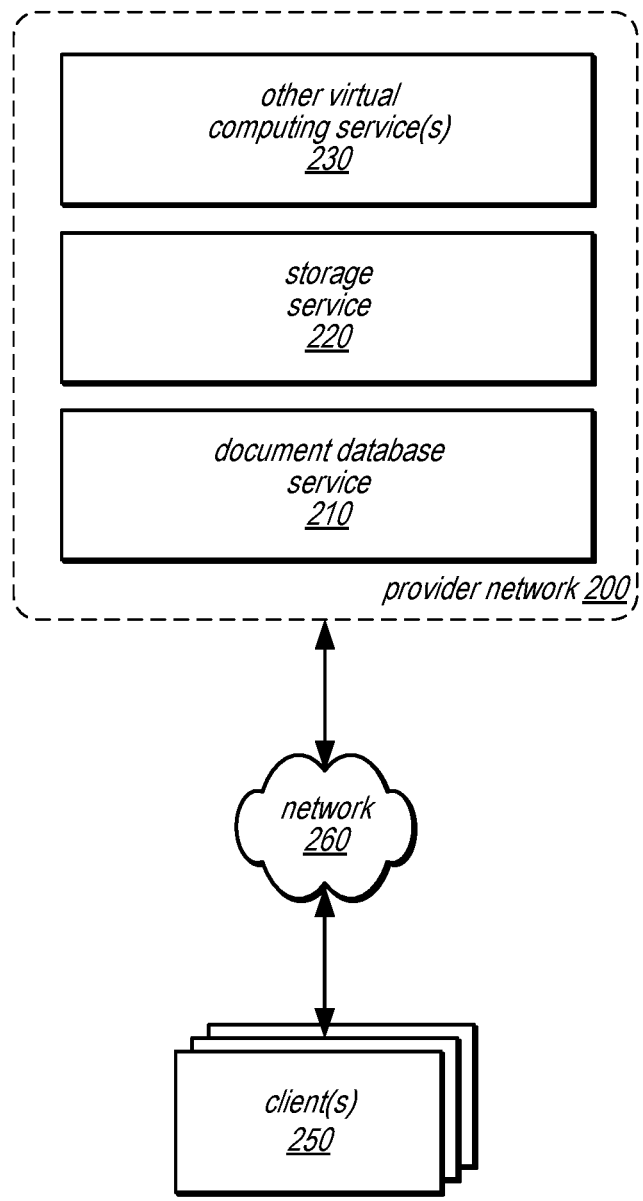
FIG. 2 is a logical block diagram illustrating a provider network that implements a document database service by emulating a non-relational database on a relational database with a distributed data store, according to some embodiments.

FIG. 2 is a logical block diagram illustrating a provider network that implements a document database service by emulating a non-relational database on a relational database with a distributed data store, according to some embodiments. A provider network may be a private or closed system or may be set up by an entity such as a company or a public sector organization to provide one or more services (such as various types of cloud-based storage) accessible via the Internet and/or other networks to clients 250, in some embodiments. The provider network may be implemented in a single location or may include numerous provider network regions, that may include one or more data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by the provider network within the provider network 200.

A number of clients (shown as clients 250) may interact with a provider network 200 via a network 260, in some embodiments. While clients 250 are shown as external to provider network 200, clients of document database service 210 (or other provider network services) could be implemented within provider network 200 (e.g., as an application hosted in other virtual computing service(s) 230). Provider network 200 may implement database service 210, storage service 220, and/or one or more other virtual computing services 230. It is noted that where one or more instances of a given component may exist, reference to that component herein may be made in either the singular or the plural. However, usage of either form is not intended to preclude the other.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 9 and described below. In various embodiments, the functionality of a given service system component (e.g., a component of the document database service or a component of the storage service) may be implemented by a particular node or may be distributed across several nodes. In some embodiments, a given node may implement the functionality of more than one service system component (e.g., more than one database service system component).

Generally speaking, clients 250 may encompass any type of client that can submit network-based services requests to provider network 200 via network 260, including requests for database services. For example, a given client 250 may include a suitable version of a web browser, or may include a plug-in module or other type of code module may execute as an extension to or within an execution environment provided by a web browser. Alternatively, a client 250 (e.g., a document database service client) may encompass an application such as a database application (or user interface thereof), a media application, an office application or any other application that may make use of persistent storage resources to store and/or access one or more database tables. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with network-based services platform 200. In some embodiments, client 250 may generate network-based services requests according to a Representational State Transfer (REST)-style web services architecture, a document- or message-based network-based services architecture, or another suitable network-based services architecture.

In some embodiments, a client 250 (e.g., a document database service client) may be may provide access to network-based storage of database documents to other applications in a manner that is transparent to those applications. For example, client 250 may be may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model, as described above. Instead, the details of interfacing to provider network 200 may be coordinated by client 250 and the operating system or file system on behalf of applications executing within the operating system environment. Although client(s) 250 are illustrated as external to provider network 200, in some embodiments, clients may be implemented with provider network 200, such as applications or systems implemented on other virtual computing resources that may make use of a document database hosted by document database service 210.

Clients 250 may convey network-based services requests to and receive responses from provider network 200 via network 260. In various embodiments, network 260 may encompass any suitable combination of networking hardware and protocols necessary to establish network-based communications between clients 250 and network-based platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and network-based services platform 200. It is noted that in some embodiments, clients 250 may communicate with provider network 200 using a private network rather than the public Internet. For example, clients 250 may be provisioned within the same enterprise as a database service system (e.g., as part of another network-based service in provider network 200 which also offers database service 210 and/or storage service 220). In such a case, clients 250 may communicate with platform 200 entirely through a virtual private network 260 (e.g., a LAN or WAN that may use Internet-based communication protocols but which is not publicly accessible).

Generally speaking, provider network 200 may implement one or more service endpoints may receive and process network-based services requests, such as requests to access data pages (or records thereof). For example, provider network 200 may include hardware and/or software may implement a particular endpoint, such that an HTTP-based network-based services request directed to that endpoint is properly received and processed. In one embodiment, provider network 200 may be implemented as a server system may receive network-based services requests from clients 250 and to forward them to components of a system that implements document database service 210, storage service 220 and/or another virtual computing service 230 for processing. In other embodiments, provider network 200 may be implemented as a number of distinct systems (e.g., in a cluster topology) implementing load balancing and other request management features may dynamically manage large-scale network-based services request processing loads. In various embodiments, provider network 200 may be may support REST-style or document-based (e.g., SOAP-based) types of network-based services requests.

Provider network 200 may implement various client management features. For example, provider network 200 may coordinate the metering and accounting of client usage of network-based services, including storage resources, such as by tracking the identities of requesting clients 250, the number and/or frequency of client requests, the size of data tables (or records thereof) stored or retrieved on behalf of clients 250, overall storage bandwidth used by clients 250, class of storage requested by clients 250, or any other measurable client usage parameter. Provider network 200 may also implement financial accounting and billing systems, or may maintain a database of usage data that may be queried and processed by external systems for reporting and billing of client usage activity. In certain embodiments, provider network 200 may collect, monitor and/or aggregate a variety of storage service system operational metrics, such as metrics reflecting the rates and types of requests received from clients 250, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments such metrics may be used by system administrators to tune and maintain system components, while in other embodiments such metrics (or relevant portions of such metrics) may be exposed to clients 250 to enable such clients to monitor their usage of document database service 210, storage service 220, and/or another virtual computing service 230 (or the underlying systems that implement those services).

In some embodiments, document database service 210 may implement user authentication and access control procedures. For example, for a given network-based services request to access a particular collection of documents, a database engine head node, discussed below, may determine whether the client associated with the request is authorized to access the particular document or collection of documents. Document database service 210 may determine such authorization by, for example, evaluating an identity, password or other credential against credentials associated with the particular database table, or evaluating the requested access to the particular document or collection of documents against an access control list for the particular database table. For example, if a client 250 does not have sufficient credentials to access the particular database table, the proxy node may reject the corresponding network-based services request, for example by returning a response to the requesting client 250 indicating an error condition. Various access control policies may be stored as records or lists of access control information by database service 210, storage service 220 and/or other virtual computing services 230.

Note that in many of the examples described herein, storage service 220 may be internal to a computing system or an enterprise system that provides document database services to clients, and may not be directly exposed to clients. In such embodiments, the internal "client" (e.g., document database service 210) may access storage service 220 over a local or private network (e.g., through an API directly between the systems that implement these services). In such embodiments, the use of storage service 220 in storing database data on behalf of clients may be transparent to those clients. In other embodiments, storage service 220 may be exposed to clients through provider network 200 to provide storage of database data or other information for applications other than those that rely on document database service 210 for database management. In such embodiments, clients of the storage service 220 may access storage service 220 via network 260 (e.g., over the Internet). In some embodiments, a virtual computing service may receive or use data from storage service 220 (e.g., through an API directly between the virtual computing service and storage service 220) to store objects used in performing computing services on behalf of a client 250. In some cases, the accounting and/or credentialing services of provider network 200 may be unnecessary for internal clients such as administrative clients or between service components within the same enterprise.

Figure 3:
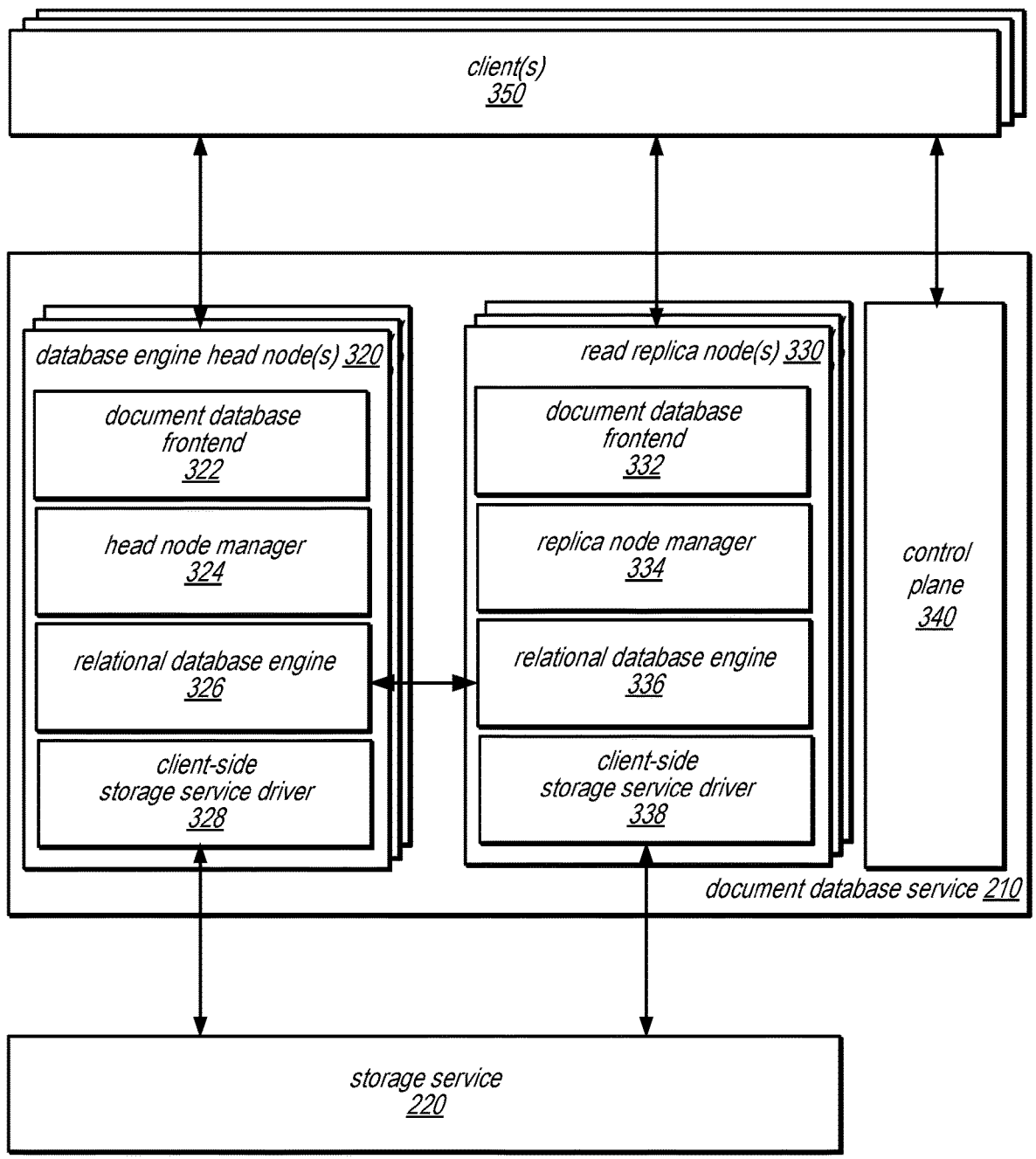
FIG. 3 is a logical block diagram illustrating various components of a document database service, according to some embodiments.

FIG. 3 is a logical block diagram illustrating various components of a document database service, according to some embodiments. In this example, document database service 210 includes respective database engine heads nodes, such as database engine head node(s) 320, for a collection of documents which may be stored at storage service 220 (which may also be called read-write nodes). As illustrated in this example, one or more of clients 350 may access a database engine head node 320 via a network (e.g., an internal network of provider network 200 or network 260) and thus database engine head nodes may be network addressable to clients. Storage service 220, which may be employed to store data pages of one or more non-relational databases (e.g., as a collection of documents) (and redo log records and/or other metadata associated therewith) on behalf of clients 350, and to perform other functions of the document database as described herein, may or may not be network-addressable and accessible to clients 350, in different embodiments. For example, in some embodiments, storage service 220 may perform various storage, access, change logging, recovery, and/or space management operations in a manner that is invisible to clients 350.

A database engine head node 320 may be implemented as virtual machine instance hosted on a server or directly (without virtualization) on a server, in different embodiments. Database engine head node 320 may receive requests from various clients (e.g., applications or interfaces operated by users) and perform them. Database engine head node 320 may implement a document database frontend 322, which as discussed below with regard to FIG. 6 may translate incoming requests formatted according to an interface for the emulated document database and outgoing responses to clients 350 (e.g., translating results or acknowledgements into the format for the interface for the emulated document database). In some embodiments, document database frontend 322 may manage connections with clients 350. In this way, document database frontend 322 can support a large number of connections and utilize a single connection with relational database engine 326. For example, document database front end 322 can support more connections than could relational database engine 326.

Database engine head node 320 may implement head node manager 324, in various embodiments. Head node manager 324 may collect performance, health, and other information for database engine head node 320 to report to control plane 340 of document database service 210. Head node manager 324 may perform various control operations, such as operations to enable, disable, configure or reconfigure the database engine head node 320, received as instructions from control plane 340. For example, head node manager 324 may handle operations to create a new collection of documents for a user of document database service, including operations to create, open, or obtain access to a storage volume in storage service 220.

Database engine head node 320 may implement relational database engine 326 to perform translated requests received from document database frontend 322, as discussed in detail below with regard to FIG. 6. For example, relational database engine 326 may parse a server query language (SQL) query translated from a non-relational request to retrieve, select, or otherwise find data, optimize the SQL query, and develops an execution plan to carry out the associated database operation(s), in some embodiments. Relational database engine 326 may include various features such as query parsing, optimization, and execution components. Relational database engine 326 may return responses to document database frontend 322 to return translated versions to client(s) 350, which may include write acknowledgements, requested data pages (or portions thereof), error messages, and or other responses, as appropriate.

Relational database engine 326 may implement a data page cache, in which data pages that were recently accessed (read and/or write) may be temporarily held. Relational database engine 326 may also implement transaction and consistency management, which may be responsible for providing transactionality and consistency in for the document database. For example, this component may be responsible for ensuring the Atomicity, Consistency, and Isolation properties of the document database instance and the transactions that are directed that the database instance. Relational database engine 326 may also include a transaction log and undo log, which may be employed by relational database engine 326 to track the status of various transactions and roll back any locally cached results of transactions that do not commit (if transactions are supported by the emulated document database). Relational database engine 326 may also maintain one or more in-memory data structures, such as various indexes, a data dictionary, active transactions information, or any other information for describing the data structure or schema of the database which may be accessed by relational database engine 326.

Database engine head node 320 may also include a client-side storage service driver 328, which may route read requests and/or change notifications (e.g., redo log records) to a read-only node and/or various storage nodes within storage service 220, receive write acknowledgements from storage service 220, receive requested data pages from distributed storage service 220, and/or return data pages, error messages, or other responses to the relational database engine 326. In some embodiments, client-side storage service driver 328 may have access to storage metadata. Storage metadata may provide an access scheme for obtaining or writing to distributed storage service 220 (e.g., mapping information to one or more components within storage service 220 storing data for a document database). When routing read or write requests to storage service 220, client-side storage service driver 328 may access storage metadata to determine the particular storage nodes to send read or write requests to.

Read replica node(s) 330 may be implemented for a document database, in some embodiments. Read replica nodes 330 may implement features similar to those of a database engine head node, such as document database frontend 332, replica node manager 334, relational database engine 336, and client-side storage service driver 338. Read replica node(s) 330 may also handle document database requests received from client(s) 350 according to the various techniques discussed below with regard to FIGS. 5 and 6. However, read replica nodes may be limited to read-only functionality (e.g., denying or dropping requests that add, remove, or update data from a document database). Read replica node(s) 330 may stay consistent with (or nearly consistent with) database engine head node(s) 320 which may perform both read and write requests utilizing a replication stream (or other stream of update indications sent from relational database engine 326 to relational database engine 336). Read replica node(s) 330 may also access data from storage service 220 to receive data for a document database. In some embodiments, multiple read replica nodes 330 may be implemented for a single database engine head node 320 that provides access to a single document database. Alternatively, one or no read replica nodes may be implemented for a document database, in some scenarios.

In some embodiments, requests to access a non-relational database may be directed to a common endpoint, which may be serviced by a request routing tier or layer of one or more request routing components (not illustrated). Instead of a client 350 directing requests to a particular database engine head node(s) 320 or read replica node(s) 330, client 350 may direct the request to the endpoint which may send the traffic to the appropriate node (e.g., writes to database engine head nodes 320, reads to read replicas 330, strongly consistent reads to database engine head nodes 320, etc.).

Document database service 210 may implement control plane 340 to perform various management operations on behalf of document database service 210. For example, control plane 340 may implement a control interface (separate from the interfaces implement at document database frontend of database engine head node 320) to allow clients 350 to create, delete, configure, or reconfigure a document database (e.g., one or more collections of documents). Control plane 340 may perform operations to handle failures, including database engine head node 320 failures, configure or procure read replica node(s) 330, among other service wide operations to ensure continuous operation of document database service 210 as a whole.

In some embodiments, a database engine head node 320 may be a single tenant component that provides access to a single document database maintained on behalf a user (or user account of provider network 200). In at least some embodiments, the schema for the document database may include a collection (which may be analogous to a table in a relational database schema without the strict schema enforcement as to the number of columns or data types of columns), which may include one or more documents (which may be analogous to rows or entries in a table), which may include in the documents one or more attributes (which may be analogous to column or field values in a table). In at least some embodiments, the storage of data for a document database, however may be maintained on storage nodes in storage service 220 that are multi-tenant (where data maintained for different collections of different users or user accounts are stored on the same storage devices and/or managed by the same storage node-even if stored on separate storage devices attached to the storage node).

Figure 4:
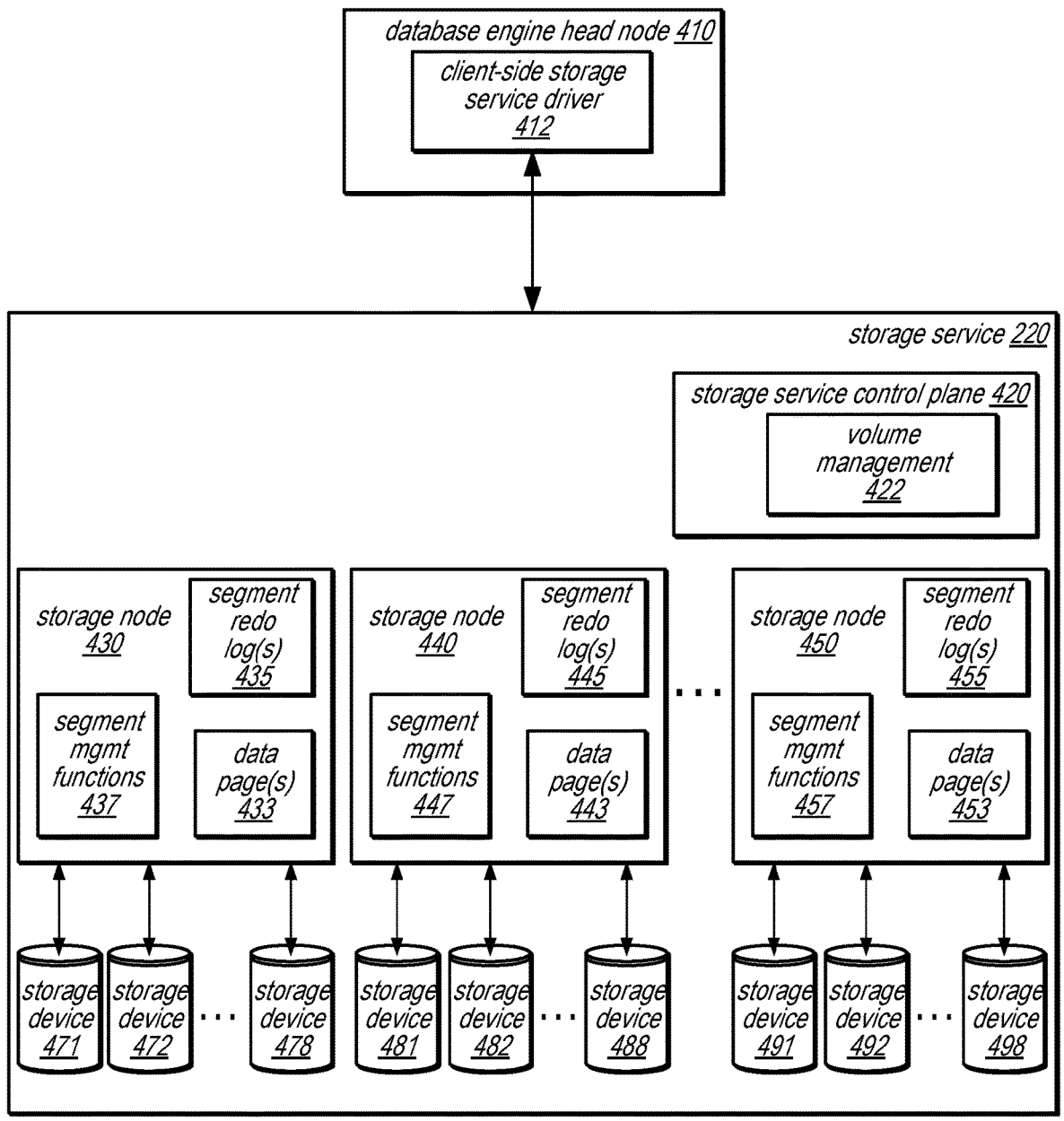
FIG. 4 is a logical block diagram illustrating a storage service that provides distributed storage for a document database service, according to some embodiments.

FIG. 4 is a logical block diagram illustrating a storage service that provides distributed storage for a document database service, according to some embodiments. A database engine head node 410 (or read replica as discussed above) may include a client-side storage service driver 412. Storage service 220 may implement, in various embodiments, multiple storage nodes (including those shown as 430, 440, and 450), each of which includes storage for data pages, redo logs for the segment(s) it stores, system metadata for database engine head node 410 (e.g., data dictionary data, transaction table data etc.) and hardware and/or software may perform various segment management functions. For example, each storage node may include hardware and/or software may perform at least a portion of any or all of the following operations: replication (locally, e.g., within the storage node), coalescing of redo logs to generate data pages, crash recovery, and/or space management (e.g., for a segment). Each storage node may also have multiple attached storage devices (e.g., SSDs) on which data blocks may be stored on behalf of clients (e.g., users, client applications, and/or database service subscribers), in some embodiments.

In the example illustrated in FIG. 4, storage node 430 includes data page(s) 433, segment redo log(s) 435, segment management functions 437, and attached storage devices 471-578. Similarly, storage node 440 includes data page(s) 443, segment redo log(s) 445, segment management functions 447, and attached storage devices 481-488; and storage node 450 includes data page(s) 453, segment redo log(s) 455, segment management functions 457, and attached storage devices 491-498.

Storage service 220 may implement storage service control plane 420 to perform various service management operations, in some embodiments. In at least some embodiments, storage service control plane 420 may implement volume management 422 which may be implemented to create database volumes for new document databases (e.g., storing one or more collections of documents on a storage volume, facilitate opening and closing of database volumes by clients, and/or recovery operations, in some embodiments.

In some embodiments, a storage device may refer to a local block storage volume as seen by the storage node, regardless of the type of storage employed by that storage volume, e.g., disk, a solid-state drive, a battery-backed RAM, an NVMRAM device (e.g., one or more NVDIMMs), or another type of persistent storage device. A storage device is not necessarily mapped directly to hardware. For example, a single storage device might be broken up into multiple local volumes where each volume is split into and striped across multiple segments, and/or a single drive may be broken up into multiple volumes simply for ease of management, in different embodiments. In some embodiments, each storage device may store an allocation map at a single fixed location. This map may indicate which storage pages that are owned by particular segments, and which of these pages are log pages (as opposed to data pages). In some embodiments, storage pages may be pre-allocated to each segment so that forward processing may not need to wait for allocation. Any changes to the allocation map may need to be made durable before newly allocated storage pages are used by the segments.

Figure 5:
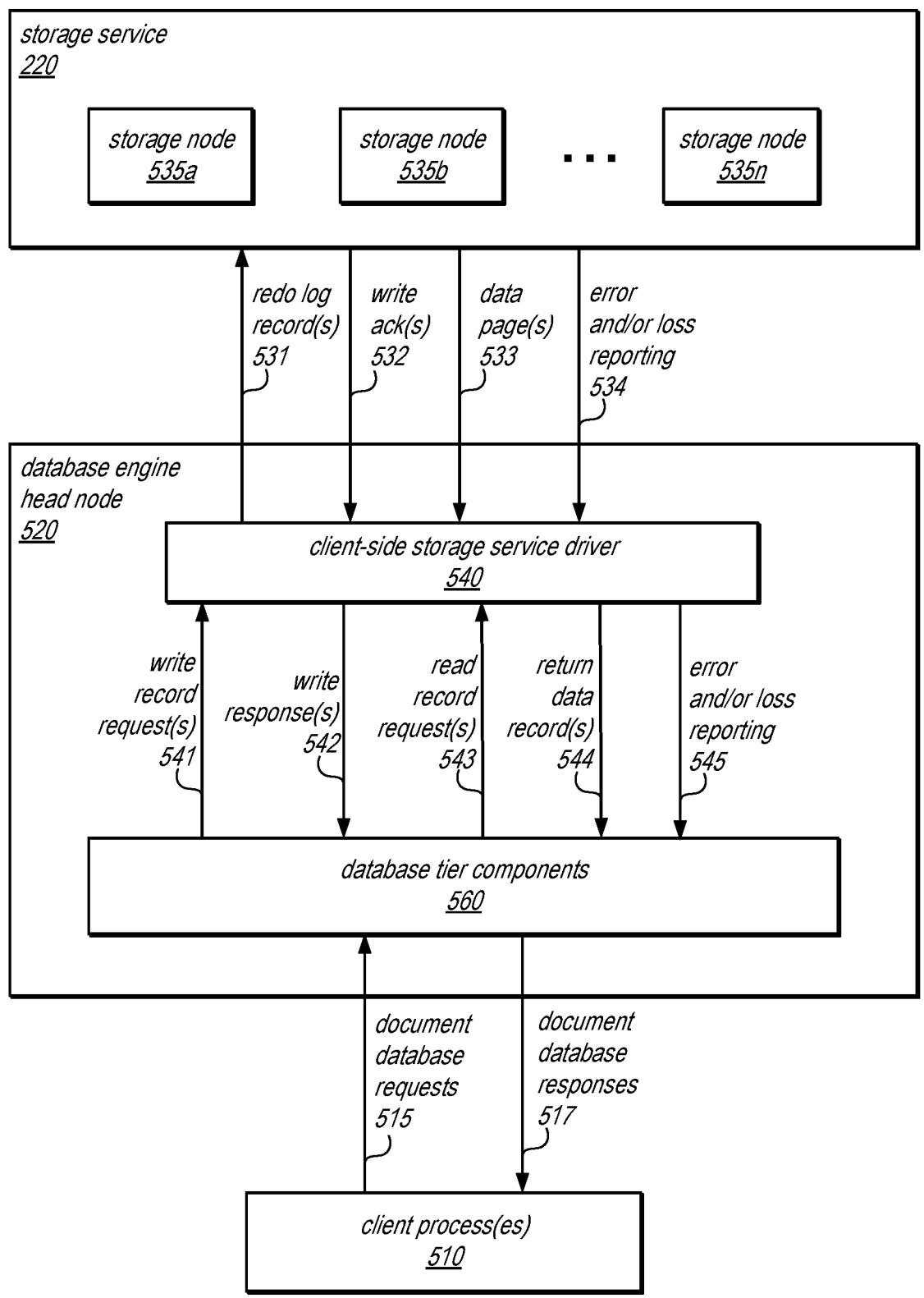
FIG. 5 is a logical block diagram illustrating the use of a separate storage system by a database engine head node, according to some embodiments.

FIG. 5 is a logical block diagram illustrating the use of a separate storage system by a database engine head node, according to some embodiments. In this example, one or more client processes 510 may store data to one or more document databases maintained by document database service 210 that includes a database engine head node 520. In the example illustrated in FIG. 5, database engine head node 520 includes database tier components 560 (e.g., a document database frontend and relational database engine as discussed below with regard to FIG. 6) and client-side storage service driver 540 (which serves as the interface between storage service 220 and database tier components 560).

In this example, one or more client processes 510 may send document database requests 515 (which may include read and/or write requests targeting data stored on one or more of the storage nodes 535a-535n) to database tier components 560, and may receive document database responses 517 from database tier components 560 (e.g., responses that include write acknowledgements and/or requested data). Each document database request 515 that includes a request to write to a page may be parsed and optimized to generate one or more write record requests 541, which may be sent to client-side storage service driver 540 for subsequent routing to storage service 220. In this example, client-side storage service driver 540 may generate one or more redo log records 531 corresponding to each write record request 541, and may send them to specific ones of the storage nodes 535 of storage service 220. Storage service 220 may return a corresponding write acknowledgement 523 for each redo log record 531 to database engine head node 520 (specifically to client-side driver 540). Client-side storage service driver 540 may pass these write acknowledgements to database tier components 560 (as write responses 542), which may then send corresponding responses (e.g., write acknowledgements) to one or more client processes 510 as one of document database responses 517.

In this example, each document database request 515 that includes a request to read a data page may be parsed and optimized to generate one or more read record requests 543, which may be sent to client-side storage service driver 540 for subsequent routing to storage service 220. In this example, client-side storage service driver 540 may send these requests to specific ones of the storage nodes 535 of storage service, and distributed storage system 530 may return the requested data pages 533 to database engine head node 520 (specifically to client-side storage service driver 540). Client-side storage service driver 540 may send the returned data pages to the database tier components 560 as return data records 544, and database tier components 560 may then send the data pages to one or more client processes 510 as document database responses 517.

In some embodiments, various error and/or data loss messages 534 may be sent from storage service 220 to database engine head node 520 (specifically to client-side driver 540). These messages may be passed from client-side storage service driver 540 to database tier components 560 as error and/or loss reporting messages 545, and then to one or more client processes 510 along with (or instead of) document database response 517.

In some embodiments, the APIs 531-534 of storage service 220 and the APIs 541-545 of client-side storage service driver 540 may expose the functionality of the storage service 220 to database engine head node 520 as if database engine head node 520 were a client of storage service 220. For example, database engine head node 520 (through client-side d storage service river 540) may write redo log records or request data pages through these APIs to perform (or facilitate the performance of) various operations of the database system implemented by the combination of database engine 520 and storage service 220 (e.g., storage, access, change logging, recovery, and/or space management operations). As illustrated in FIG. 5, storage service 220 may store data blocks on storage nodes 535a-535n, each of which may have multiple attached SSDs. In some embodiments, storage service may provide high durability for stored data block through the application of various types of redundancy schemes.

Note that in various embodiments, the API calls and responses between database engine 520 and storage service (e.g., APIs 531-534) and/or the API calls and responses between client-side storage service driver 540 and database tier components 560 (e.g., APIs 541-545) in FIG. 5 may be performed over a secure proxy connection (e.g., one managed by a gateway control plane), or may be performed over the public network or, alternatively, over a private channel such as a virtual private network (VPN) connection. These and other APIs to and/or between components of the database systems described herein may be implemented according to different technologies, including, but not limited to, Simple Object Access Protocol (SOAP) technology and Representational state transfer (REST) technology. For example, these APIs may be, but are not necessarily, implemented as SOAP APIs or RESTful APIs. SOAP is a protocol for exchanging information in the context of Web-based services. REST is an architectural style for distributed hypermedia systems. A RESTful API (which may also be referred to as a RESTful web service) is a web service API implemented using HTTP and REST technology. The APIs described herein may in some embodiments be wrapped with client libraries in various languages, including, but not limited to, C, C++, Java, C #and Perl to support integration with database engine head node 520 and/or distributed storage system 530.

Figure 6:
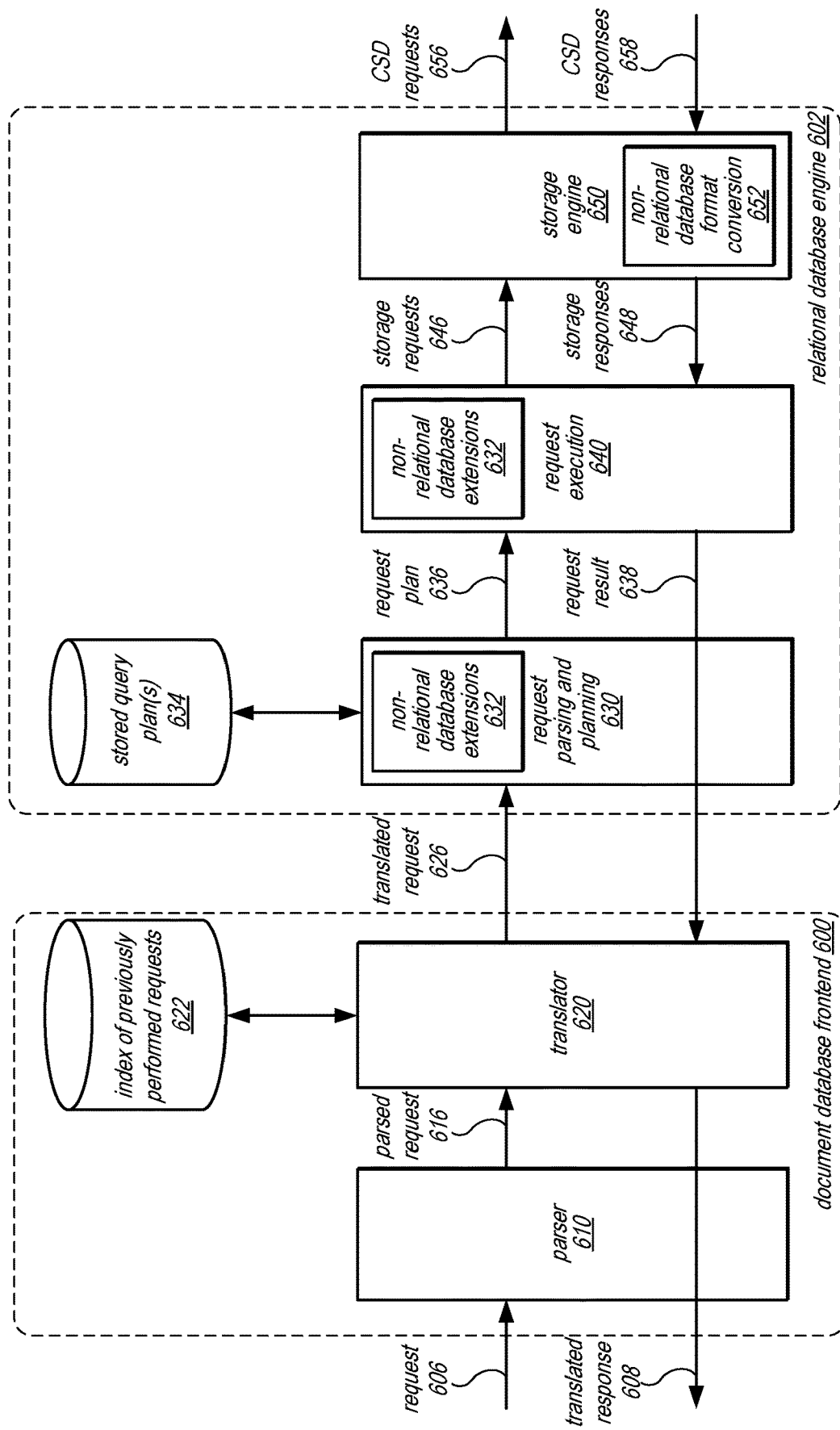
FIG. 6 is a logical block diagram illustrating interactions between a document database frontend and a relational database engine as part of emulating a document database service on a relational database, according to some embodiments.

FIG. 6 is a logical block diagram illustrating interactions between a document database frontend and a relational database engine as part of emulating a document database service on a relational database, according to some embodiments. Document database frontend 600 may receive requests 606 formatted according to an interface for an emulated document database. Parser 610 may accept the request and perform a check for syntax validity (e.g., correct operators). Parser 610 may generate a parsed version of the request 606, like a symbol tree or parse tree. The parsed request 616 may be provided to translator 620.

Translator 620 may apply a rules-based translation technique, in some embodiments, that maps document database operations to corresponding operations in the relational database. For example, a comparison operator invoked in one manner for the emulated document database may be mapped to the manner for invoking the comparison operator using the relational database engine 602. Translator may recognize operations or features in parsed request that invoke extensions, additions, libraries, or other features 632 to support a non-relational database like a document database in relational database engine 602 and utilize the appropriate syntax and format to invoke them (e.g., in scenarios where the extensions may override or differ from a standard implementation of the operation at relational database engine 602.

Translator 620 may utilize an index of previously performed requests 622 of translations. Translator 620 may perform matching techniques to check to see if whether the parsed request has already been translated. For example, a bit vector other representation (e.g., a signature value) of a parsed request may be generated and compared with bit vectors representing cached translations in an index of cached translations 622 to identify a match exists. In at least some embodiments, a matching request may not be an exact match. For example, a request to search a collection of documents for a particular "User ID" may be cached where the collection of documents is a static feature of the request and the "User ID" may be a changeable parameter. Therefore the representations for matching cached translations may exclude the changeable parameters for the sake of determining whether a match exists. If the parsed request 616 matches a previously performed query in index 622, then translator 620 may utilize the cached translation to request performance of request 606. If the parsed request 616 does not match a previously performed request in index 622, then translator 620 may update the indexed requests 622 to include the parsed request as part of indexed requests to save performance costs at a subsequent invocation of a matching request.

Translator 620 may submit translated request 626 to relational database engine 602 via an interface for the relational database engine 602. If the request is not previously performed, translator 620 may submit the translated request 626 along with a request to store a query plan for performing the request (e.g., using a prepare statement request or feature) for the translated request (so that it can be stored as part of stored query plan(s) 634). If the request was recognized as a previously performed request, the translated request 626 may be submitted as a request to invoke use of a stored query plan (e.g., specified by a prepared statement according to an identifier). As part of the request to use a stored query plan statement, translator 620 would identify the parameters to be included in the request (e.g., those changeable parameters, like "User Id" which may differ from one invocation of the request to another).

Request parsing and planning 630 may handle translated request 626 as a relational database request. If the request 626 invokes a stored query plan, then the query plan stored may be used (along with the supplied parameter values) and provided 636 to request execution 640, allowing request planning and parsing 630 to skip the planning operations that would be performed if the plan was not already stored. If a stored query plan is not used, then request parsing and planning 630 may perform various plan generation and optimization techniques. For example, a cost-based optimizer may select a plan from amongst multiple possible plans that has a lowest cost (e.g., lowest resource cost, time cost, etc.).

In order to support some non-relational database operations at relational database engine 602, request parsing and planning 630 may utilize one or more libraries or other extensions to support specific non-relational database features. For example, filter operations may be added as extensions 632 to return a subset of documents, including simple comparisons (greater than, less than), logical operations (and, or not) and regular expression searches. Projection operations may be added as extensions 632 to return a subset of a document, like sub-document extraction, array slicing, and query-based extraction operations. Update operations may be added that mutate a set of documents, such as "increment the foo.bar attribute." Array expansion may be added as part of extensions 632 to return an iterator. Extensions 632 may also handle features such as cross type comparisons (e.g., string compared to integer) and sort ordering for searching arrays. Extensions 632 may also include updates or modifications to how indexes for a database are handled, such as a schema-less index that contains in combination of data types which may be found within the non-relational data type (e.g., integers, strings, documents, found within a JSONB type).

Request execution 640 may accept the generated request plan 636 (either from a stored query plan or newly generated) and perform the request by making storage requests 646 to storage engine 650. Request execution 640 may rely upon non-relational database extensions 632 to perform various operations specified in the request plan. Storage engine 650 may translate storage requests into requests for the appropriate pages of data, which may then be sent as CSD requests 656 to the client-side storage service driver at the head node to send to the appropriate storage nodes in storage service 220. CSD responses 658 may be received back (as discussed above with regard to FIG. 5) and provided 648 to request execution 640. As the requested result is generated, it may be returned 638 to document database frontend 60 at translator 620, which may then reformat the response (e.g., either as result or acknowledgement) to provide 608 to a client.

In some embodiments, storage engine 650 may implement a non-relational database object storage format conversion 652 for storing and retrieving data from storage service 220. In this way, a storage format for the data can differ from the storage format of the data processed by request execution 640 (e.g., to allow for optimal storage of the data without changing the format understood by request execution 640).

Figure 7:
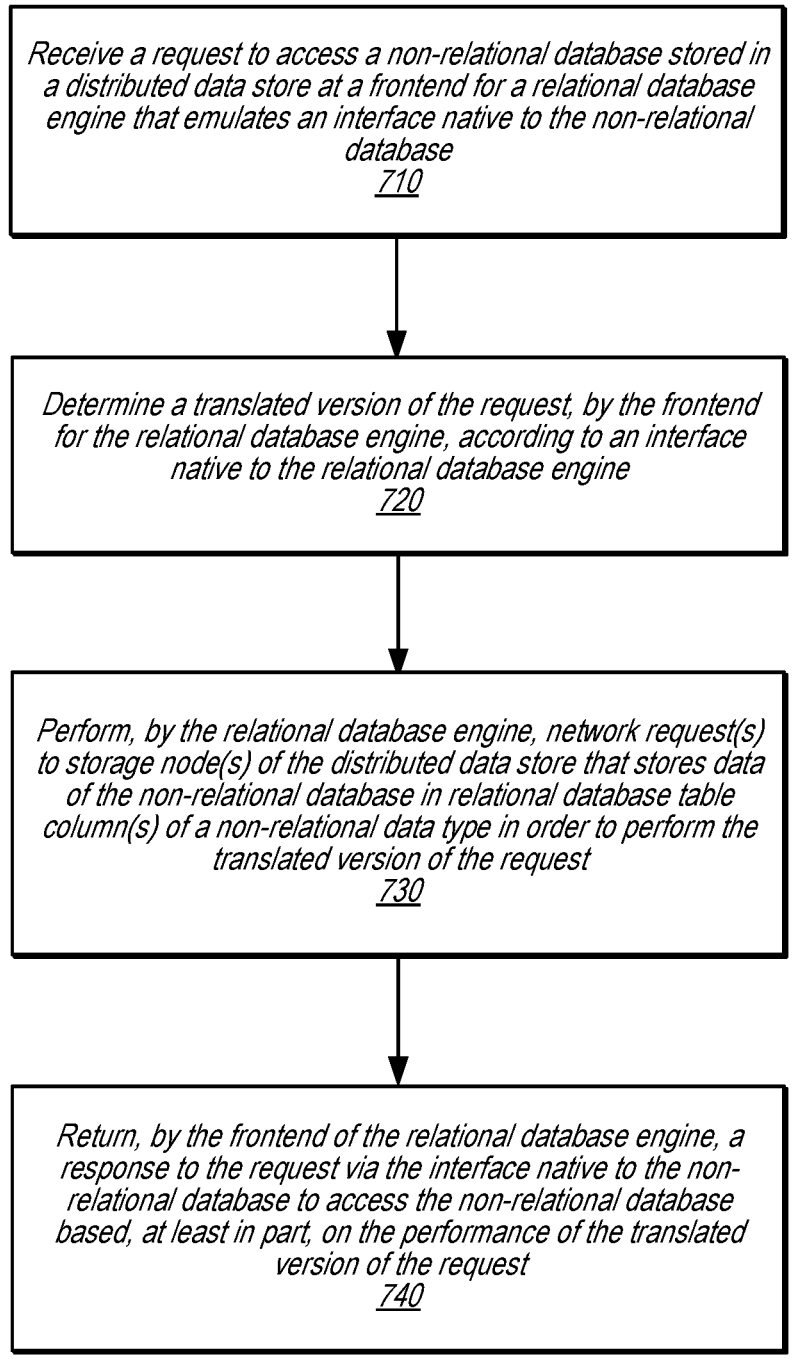
FIG. 7 is a high-level flowchart illustrating various methods and techniques for emulating a non-relational database on a relational database with a distributed data store, according to some embodiments.

The document database service and storage service discussed in FIGS. 2 through 6 provide examples of a system that may emulate a non-relational database on a relational database with a distributed data store. However, various other types of database systems may emulate a non-relational database on a relational database with a distributed data store. For example, a non-log structured storage system could be utilized to implement separate storage for a relational database system. FIG. 7 is a high-level flowchart illustrating various methods and techniques for emulating a non-relational database on a relational database with a distributed data store, according to some embodiments. Various different systems and devices may implement the various methods and techniques described below, either singly or working together. For example, a database engine head node may implement the various methods. Alternatively, a combination of different systems and devices. Therefore, the above examples and or any other systems or devices referenced as performing the illustrated method, are not intended to be limiting as to other different components, modules, systems, or configurations of systems and devices.

As indicated at 710, a request to access a non-relational database stored in a distributed data store at a frontend for a relational database engine may be received that emulates an interface native to the non-relational database, in some embodiments. For example, the request may be specified using a language, protocol, API, and/or other format that is supported by a non-relational database engine. The frontend may support the same language, protocol, API and/or other format as the non-relational database engine so that a client application would not have to perform code changes to account for a change between an application that utilized a non-relational database engine to access the non-relational database and the frontend for the relational database (although changes to database location pointers, such as the network address of the non-relational database, may have to be made).

As indicated at 720, a translated version of the request may be determined by the frontend for the relational database engine according to an interface native to the relational database engine. For example, as discussed above, various rules-based translations and mappings (e.g., by applying one or more decision trees) may be used to translate between features of the different interfaces. As discussed below with regard to FIG. 8, in some scenarios a stored version of the translated request may already be available for use so that determining a translation may involve updating a previously stored query plan (e.g., in a prepared statement) with the parameter values specified in the request.

As indicated at 730, the relational database engine may perform one or more network requests to storage node(s) of the distributed data store that stores data of the non-relational database in relational database table column(s) of a non-relational data type in order to perform the translated version of the request, in some embodiments. For example, a relational database table corresponding to a collection of documents may store a document in a separate row of a table, where the content of the document is stored in one (or more) JSON data type columns. The relational database engine may generate (if not using a prepared statement or other stored query plan) and execute a plan to perform the request to access the specified data at the storage nodes. An index for the relational database may be generated according to the information in the non-relational data type columns (e.g., over one or more attribute values in the field) which may be used to perform query planning and/or identify which storage nodes and portions of the relational table should be returned.

As indicated at 740, a response to the request based, at least in part, on the performance of the translated version of the request may be returned by the frontend of the relational database engine via the interface native to the non-relational database. For example, success, failure, or errors may be translated and returned based on the corresponding results of the performance by the relational database engine at element 730. Similarly, result values (e.g., queried for values) may be formatted according to the non-relational database format, style, presentation, order and/or other expected features that match the interface of the non-relational database.

Figure 8:
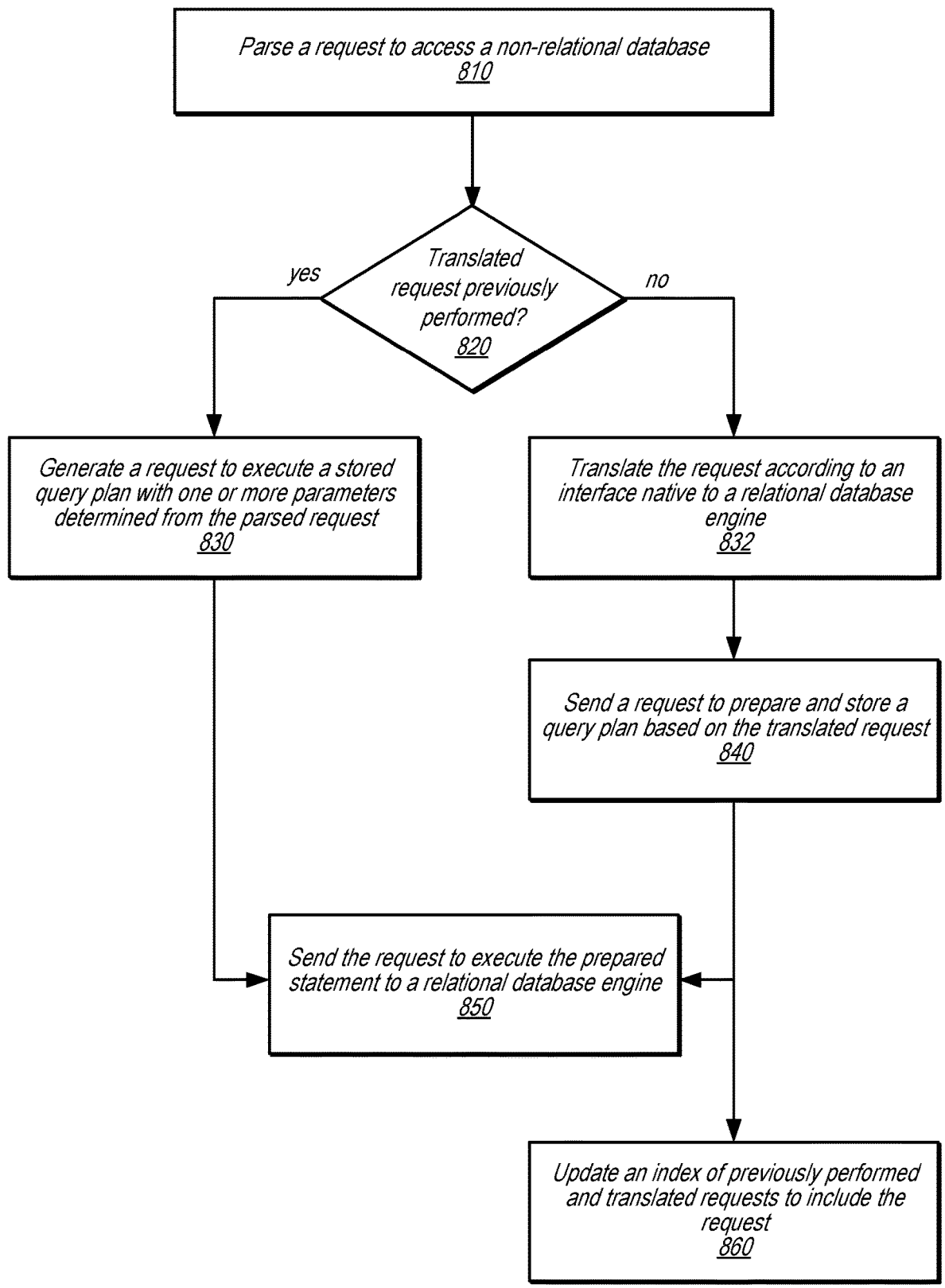
FIG. 8 is a high-level flowchart illustrating various methods and techniques for translating a request to access a non-relational database to an interface native to a relational database engine, according to some embodiments.

FIG. 8 is a high-level flowchart illustrating various methods and techniques for translating a request to access a non-relational database to an interface native to a relational database engine, according to some embodiments. As indicated at 810, a request to access a non-relational database may be parsed, in some embodiments. For example, a symbol tree or other parse representation may be generated. A determination may be made as indicated at 820 as to whether a version of the translated request is previously performed. For example, a representation of a request, such as a bit vector or other encoding scheme for requests may be used to compare the request with cached requests. In some embodiments, a text comparison technique (without representation) may be used to identify whether a translated request exists. In some embodiments, parameter values which may be changeable from one invocation of the same request to another may be excluded from the comparison.

If a translated version of the request exists in an index of previously performed requests, then as indicated at 830, a request to execute a stored query plan that invokes the stored version may be generated with one or more parameters determined from the parsed request, in some embodiments. For example, a prepared statement feature may be invoked using an identifier that may be stored along with a template of the format of the request to complete, in some embodiments. As indicated at 850, a request may be sent to execute the stored query plan for the request to a relational database engine, in various embodiments.

If a translated version of the request is not previously performed, then as indicated at 832, the request may be translated according to an interface native to a relational database engine 832. For example, as discussed above, the various rules-based operations and decisions may be applied to generate a SQL version of a NoSQL database request. A request may then be sent, as indicated at 840 to prepare and store a query plan based on the translated request. In this way, the relational database engine may store a query plan generated for the request to avoid plan generation costs the next time the request is received. The index of previously performed and translated requests may be updated to include the request, as indicated at 860. For example, the handle or identifier for the prepared statement may be stored along with the representation of the request for determining future matches. As indicated at 850, a request may be sent to execute the stored query plan for the request to a relational database engine, in various embodiments.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 9:
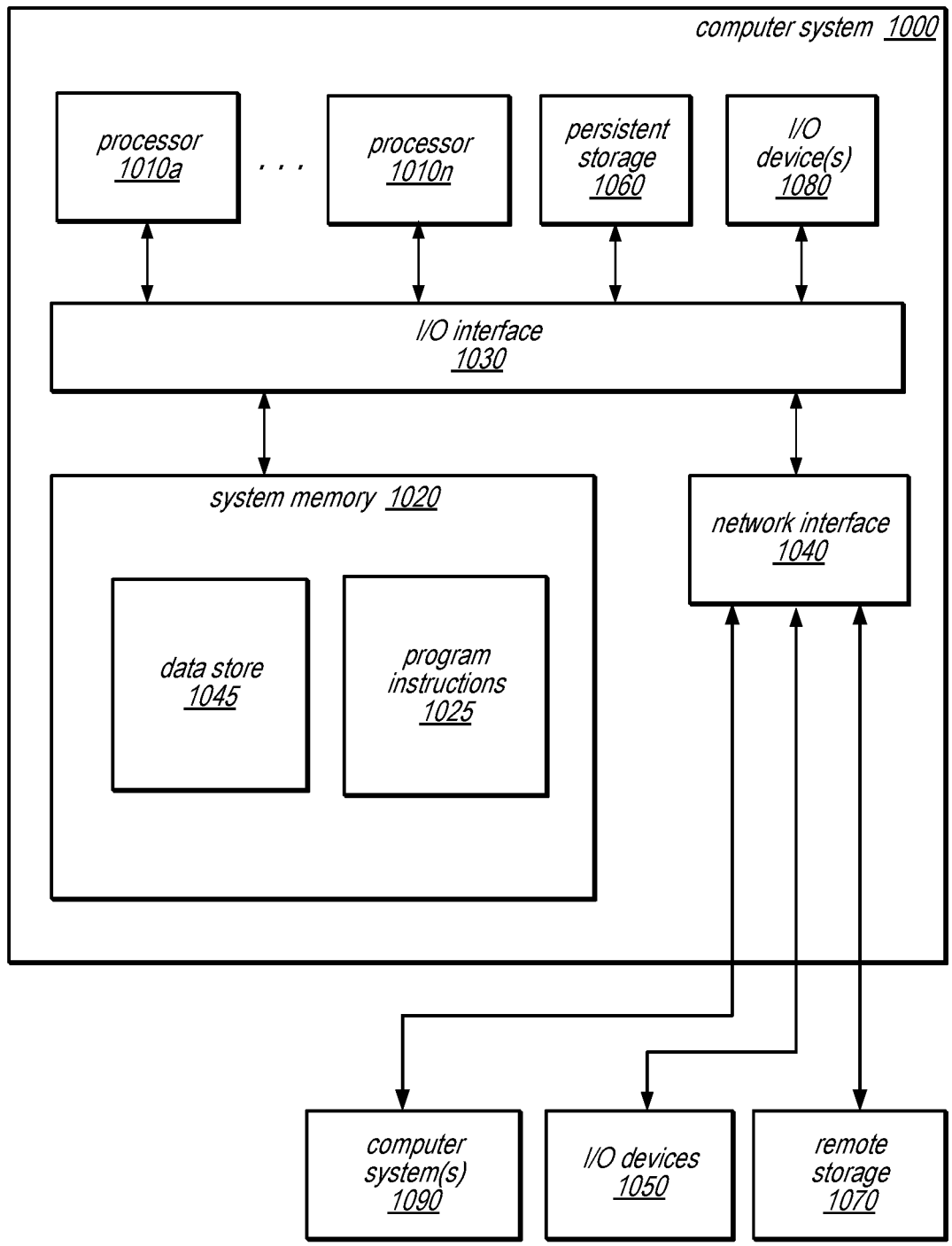
FIG. 9 is a block diagram illustrating an example computer system, according to various embodiments.

Embodiments of emulating a non-relational database on a relational database with a distributed data store as described herein may be executed on one or more computer systems, which may interact with various other devices. FIG. 9 is a block diagram illustrating a computer system, according to various embodiments. For example, computer system 1000 may implement a query engine or other database engine head node, or storage nodes of a storage system that stores database tables and associated metadata on behalf of clients of the database tier, in various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the database systems described herein. In another example, an instance of a server application executing on computer system 1000 may use network interface 1040 to communicate with other instances of the server application (or another server application) that may be implemented on other computer systems (e.g., computer systems 1090).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that may store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of non-relational database front end or request handling tier, a read-write node of a database tier (e.g., a database engine head node) or read-only node of the database tier (e.g., read replica node), one of a plurality of read-only nodes, or one of a plurality of storage nodes of a separate distributed storage system that stores database tables and associated metadata on behalf of clients of the database tier, in various embodiments. In some embodiments, program instructions 1025 may implement multiple separate clients, server nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. For example, the information described herein as being stored by the database tier (e.g., on a primary node), such as a transaction log, an undo log, cached page data, or other information used in performing the functions of the database tiers described herein may be stored in data store 1045 or in another portion of system memory 1020 on one or more nodes, in persistent storage 1060, and/or on one or more remote storage devices 1070, at different times and in various embodiments. Along those lines, the information described herein as being stored by a read replica, such as various data records stored in a cache of the read replica, in-memory data structures, manifest data structures, and/or other information used in performing the functions of the read-only nodes described herein may be stored in data store 1045 or in another portion of system memory 1020 on one or more nodes, in persistent storage 1060, and/or on one or more remote storage devices 1070, at different times and in various embodiments. Similarly, the information described herein as being stored by the storage tier (e.g., redo log records, data pages, data records, and/or other information used in performing the functions of the distributed storage systems described herein) may be stored in data store 1045 or in another portion of system memory 1020 on one or more nodes, in persistent storage 1060, and/or on one or more remote storage devices 1070, at different times and in various embodiments. In general, system memory 1020 (e.g., data store 1045 within system memory 1020), persistent storage 1060, and/or remote storage 1070 may store data blocks, replicas of data blocks, metadata associated with data blocks and/or their state, database configuration information, and/or any other information usable in implementing the methods and techniques described herein.

In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems 1090 (which may implement one or more storage system server nodes, primary nodes, read-only node nodes, and/or clients of the database systems described herein), for example. In addition, network interface 1040 may allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor cause the at least one processor to implement a database engine head node, wherein the database engine head node implements a relational database engine;
   wherein the database engine head node is configured to:
      store document database data in one or more relational database table columns of a relational database table, wherein the one or more relational database table columns are of a non-relational data type and the document database data comprises content of a document stored in a non-relational data format;
      receive a request to access the document database data stored in the one or more relational database table columns of the relational database table accessible through the relational database engine, wherein the request is received via an interface native to a document database engine, and wherein the request is specified in a first communication format of the document database engine;
      translate the request, wherein the request is translated from the first communication format to a second communication format of the relational database engine, according to an interface native to the relational database engine implemented at the database engine head node;
      based on an index for the relational database table generated at least in part according to information in the one or more relational database table columns of a non-relational data type, generate, by the relational database engine, a query plan to perform the request, wherein the query plan includes a projection operation identified by the relational database engine for accessing the non-relational data type to return a subset of the document;
      execute the query plan by the relational database engine, wherein the execution sends, by the relational database engine, one or more network requests to one or more storage nodes of a distributed data store to access the document database data having the non-relational data format stored in the one or more relational database table columns of the non-relational data type as part of performing the translated request; and
      return a response to the request via the interface native to the document database engine based, at least in part, on the performance of the translated request.

2. The system of claim 1,
   wherein to translate the request, the database engine head node is configured to:
      responsive to a determination that the translated version of the request is previously performed, generate a request to execute a stored query plan at the relational database engine with one or more parameters determined from the request;
   wherein the database engine head node is further configured to send the request to execute the stored query plan to the relational database engine to be performed.

3. The system of claim 1, wherein the database engine head node is further configured to:
   responsive to a determination that the request is not previously performed:
      send a request to the relational database engine to store the query plan for the translated request;
      generate a request to execute the stored query plan at the relational database engine with one or more parameters determined from the request; and
   send the request to execute the stored query plan to the relational database engine to be performed.

4. The system of claim 1, wherein the database engine head node is implemented as part of a document database service of a provider network, wherein the distributed data store is a log-structured storage service implemented as part of the provider network.

5. A method, comprising:
   storing, by a relational database engine, non-relational database data in one or more relational database table columns of a relational database table, wherein the one or more relational database table columns are of a non-relational data type and the non-relational database data comprises content of a document stored in a non-relational data format;
   receiving a request to access the non-relational database data stored in the one or more relational database table columns of the relational database table accessible through the relational database engine, wherein the request is received at a frontend for the relational database engine that emulates an interface native to a non-relational database, and wherein the request is specified in a first communication format of a non-relational database engine;
   determining a translated version of the request, by the frontend for the relational database engine, according to an interface native to the relational database engine, wherein the request is translated from the first communication format to a second communication format of the relational database engine;
   based on an index for the relational database table generated at least in part according to information in the one or more relational database table columns of a non-relational data type, generating, by the relational database engine, a query plan to perform the request, wherein the query plan includes a projection operation identified by the relational database engine for accessing the non-relational data type to return a subset of the document;
   executing the query plan by the relational database engine, wherein the executing comprises performing, by the relational database engine, one or more network requests to one or more storage nodes of a distributed data store that stores the non-relational database data having the non-relational data format in the one or more relational database table columns of the non-relational data type as part of performing the translated version of the request; and
   returning, by the frontend of the relational database engine, a response to the request via the interface native to the non-relational database to access the non-relational database based, at least in part, on the performance of the translated version of the request.

6. The method of claim 5, wherein the request is a request to read data from the non-relational database and wherein returning the response to the request via the interface native to the non-relational database comprises translating one or more results of the read request received from the relational database engine.

7. The method of claim 5,
wherein determining the translated version of the request comprises:
responsive to a determination that the translated version of the request is previously performed, generating a request to execute a stored query plan at the relational database engine with one or more parameters determined from the request;
wherein the method further comprises sending the request to execute the stored query plan to the relational database engine to be performed.

8. The method of claim 5,
wherein determining the translated version of the request comprises:
responsive to a determination that the translated version of the request is not previously performed:
translating the request according to the interface native to the relational database engine;
sending a request to the relational database engine to store the query plan for the translated request; and
generating a request to execute the stored query plan at the relational database engine with one or more parameters determined from the request;
wherein the method further comprises sending the request to execute the stored query plan to the relational database engine to be performed.

9. The method of claim 8, further comprising updating an index previously performed and translated requests to include the request.

10. The method of claim 5, wherein returning the response to the request via the interface native to the non-relational database comprises translating an acknowledgement of the request.

11. The method of claim 5, further comprising converting data received from the one or more storage nodes from a first storage format to a second storage format as part of performing the translated version of the request.

12. The method of claim 5, wherein the request to access the non-relational database is a write request, and wherein the one or more computing devices implement a read-write node for the non-relational database.

13. The method of claim 5, wherein a first node, comprising at least one processor and a memory implements the frontend for the relational database engine, and wherein a second node, comprising at least one other processor and one other memory implements the relational database engine.

14. One or more non-transitory, computer-readable storage media, storing program instructions that when executed on or across one or more computing devices cause the one or more computing devices to implement:
storing, by a relational database engine, non-relational database data in one or more relational database table columns of a relational database table, wherein the one or more relational database table columns are of a non-relational data type and the non-relational database data comprises content of a document stored in a non-relational data format;
receiving a request to access the non-relational database data stored in the one or more relational database table columns of the relational database table accessible through the relational database engine, wherein the request is received at a frontend for the relational database engine that emulates an interface native to the non-relational database, and wherein the request is specified in a first communication format of a non-relational database engine;
generating a translated version of the request, by the frontend for the relational database engine, according to an interface native to the relational database engine, wherein the request is translated from the first communication format to a second communication format of the relational database engine;
based on an index for the relational database table generated at least in part according to information in the one or more relational database table columns of a non-relational data type, generating, by the relational database engine, a query plan to perform the request, wherein the query plan includes a projection operation identified by the relational database engine for accessing the non-relational data type to return a subset of the document;
executing the query plan by the relational database engine, wherein the executing comprises performing the translated version of the request, by the relational database engine, to send one or more network requests to one or more storage nodes of a distributed data store that stores the non-relational database data having the non-relational data format in the one or more relational database table columns of the non-relational data type; and
returning, by the frontend of the relational database engine, a response to the request via the interface native to the non-relational database to access the non-relational database based, at least in part, on the performance of the translated version of the request.

15. The one or more non-transitory, computer-readable storage media of claim 14,
wherein, in determining the translated version of the request, the one or more non-transitory, computer-readable storage media further comprise program instructions to further cause the one or more computing devices to implement:
responsive to a determination that the translated version of the request is previously performed, identifying a stored query plan to perform the request at the relational database engine with one or more parameters determined from the request;
wherein the one or more non-transitory, computer-readable storage media further comprise program instructions to further cause the one or more computing devices to implement causing the relational database engine to perform the stored query plan.

16. The one or more non-transitory, computer-readable storage media of claim 14,
wherein, in determining the translated version of the request, the one or more non-transitory, computer-readable storage media further comprise program instructions to further cause the one or more computing devices to implement:
responsive to a determination that the translated version of the request is not previously performed:
translating the request according to the interface native to the relational database engine;
sending a request to the relational database engine to store the query plan generated for the translated version of the request; and wherein the one or more non-transitory, computer-readable storage media further comprise program instructions to further cause the one or more computing devices to implement causing the relational database engine to perform the stored query plan with one or more parameters determined from the request.

17. The one or more non-transitory, computer-readable storage media of claim 14, wherein the translated request includes one or more operations specified in a non-relational database extension for the relational database engine.

18. The one or more non-transitory, computer-readable storage media of claim 14, wherein the request is a request to read data from the non-relational database and wherein, in returning the response to the request via the interface native to the non-relational database, the one or more non-transitory, computer-readable storage media further comprise program instructions to further cause the one or more computing devices to implement translating one or more results of the read request received from the relational database engine.

19. The one or more non-transitory, computer-readable storage media of claim 14, wherein the request to access the non-relational database is a write request, and wherein the one or more computing devices implement a read-write node for the non-relational database.

20. The one or more non-transitory, computer-readable storage media of claim 14, wherein the frontend and the relational database engine are implemented as part of a database engine head node of a database service of a provider network, wherein the distributed data store is a separate storage service implemented as part of the provider network.

* * * * *